United States Patent [19]

Kawahara et al.

[11] Patent Number: 4,518,975
[45] Date of Patent: May 21, 1985

[54] ELECTROSTATIC RECORDING APPARATUS

[75] Inventors: Yoshihiro Kawahara; Kiyoshi Hayashi, both of Osaka, Japan

[73] Assignee: Mita Industrial Company Limited, Osaka, Japan

[21] Appl. No.: 445,475

[22] Filed: Nov. 30, 1982

[30] Foreign Application Priority Data

Nov. 30, 1981 [JP] Japan .................. 56-192381
Nov. 30, 1981 [JP] Japan .................. 56-192382
Nov. 30, 1981 [JP] Japan .................. 56-192384

[51] Int. Cl.³ .......................................... G01D 15/06
[52] U.S. Cl. ................... 346/153.1; 346/155; 355/3 R
[58] Field of Search .............. 346/153.1, 155; 355/3 R

[56] References Cited

U.S. PATENT DOCUMENTS

3,896,451  7/1975  Omi ........................... 346/153
4,114,536  9/1978  Kaneko et al. ............ 346/153.1 X
4,115,817  9/1978  Suzuki et al. .............. 358/288
4,116,557  9/1978  Kushima et al. ........... 355/1 X
4,131,358  12/1978  Windele ..................... 355/3 TR
4,162,503  7/1979  Potma et al. ............... 346/163
4,446,471  5/1984  Yano ........................ 346/153.1

Primary Examiner—Fred L. Braun
Attorney, Agent, or Firm—Wenderoth, Lind & Ponack

[57] ABSTRACT

An electrostatic recording apparatus for recording, developing and fixing an image on a sheet of recording paper includes an electrostatic recording head and a roller for forming an electrostatic image on the sheet of recording paper while the latter travels between the electrostatic recording head and the roller. The electrostatic recording head and the roller are relatively movable toward each other for pressing the sheet of recording paper against the electrostatic recording head during a period of time in which the sheet of recording paper travels between the electrostatic recording head and the roller to allow the electrostatic recording head to form the electrostatic image on the sheet of recording paper. The electrostatic recording head and the roller are relatively displaceable away from each other during a period of time other than the above period of time. The roller has a first portion which rotates whenever a sheet of recording paper passes between the recording head and the roller, and a second portion which rotates only when a sheet of paper having a predetermined width passes between the recording head and the roller.

7 Claims, 12 Drawing Figures

ELECTROSTATIC RECORDING APPARATUS

BACKGROUND OF THE INVENTION

1. Field of the Invention

The present invention relates to an electrostatic recording apparatus of the type in which an electrostatic image is recorded by an electrostatic recording head onto a sheet of recording paper as the latter travels between the electrostatic recording head and a roller, and the electrostatic image as recorded is then developed and fixed on the sheet of recording paper.

2. Description of the Prior Art

Figure 1:
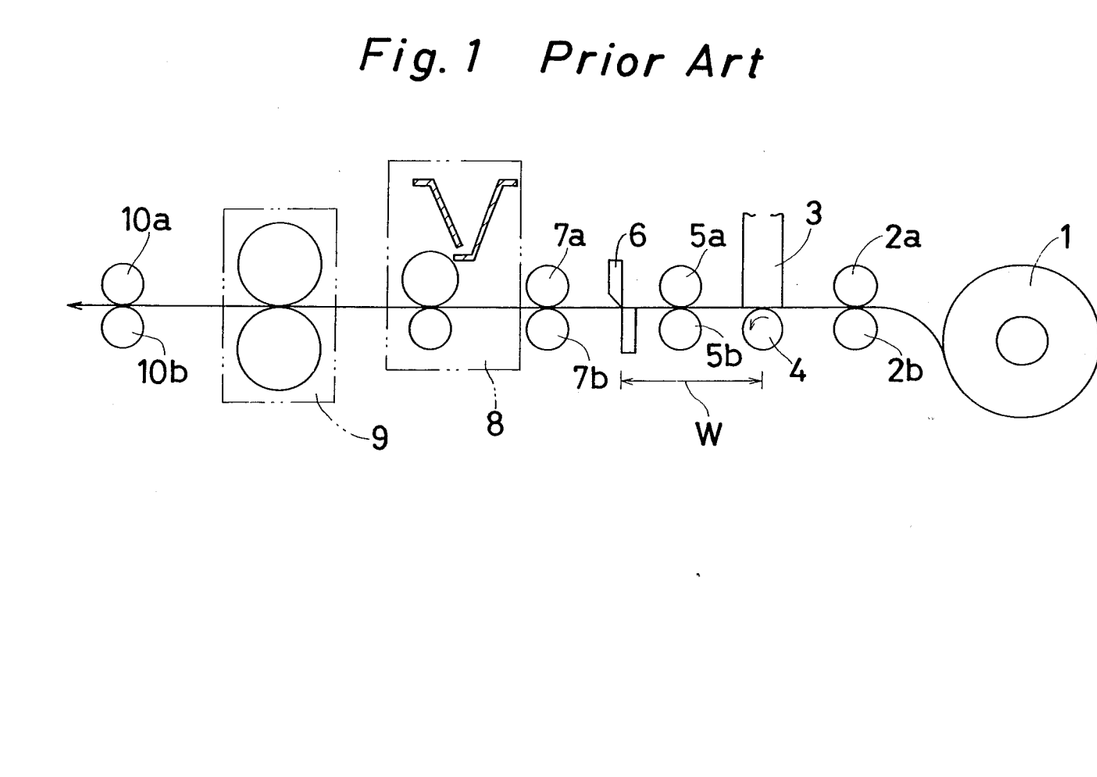
FIG. 1 is a schematic diagram of a typical conventional electrostatic recording apparatus.

FIG. 1 shows a typical prior electrostatic recording apparatus. A rolled sheet 1 of recording paper is transported by a pair of transport rollers 2a, 2b so as to travel between an electrostatic recording head 3 and a roller 4, during which time an electrostatic image is formed on the continuous sheet 1 by the electrostatic recording head 3. The continuous sheet 1 with the electrostatic image thereon is caused by a pair of transport rollers 5a, 5b to pass through a cutter 6, and by a pair of transport rollers 7a, 7b to enter a development device 8, in which the electrostatic image is developed into a toner image. The toner image thus developed on the continuous sheet 1 is then fixed by a fixation device 9. The continuous sheet 1 is thereafter discharged by a pair of discharge rollers 10a, 10b out of the electrostatic recording apparatus. The continuous sheet 1 is cut off at its trailing end by the cutter 6 when electrostatic recording by the electrostatic recording head 3 is completed.

The continuous sheet 1 is pressed against the electrostatic recording head 3 by the roller 4 as the continuous sheet 1 is fed between the electrostatic recording head 3 and the roller 4 on driven rotation of the latter. When the roller 4 is accidentally driven to rotate with no recording paper present between the electrostatic recording head 3 and the roller 4, electrodes mounted on the electrostatic recording head 3 are liable to become damaged by frictional engagement with the roller 4. To eliminate such a problem, the cutter 6 is located at the downstream side of the electrostatic recording head 3 and the roller 4 with respect to the direction of feed of the continuous sheet 1, so that the continuous sheet 1 is interposed between the roller 4 and the electrostatic recording head 3 at all times to protect the electrodes on the electrostatic recording head 3 against contact with the roller 4. Such an arrangement, however, allows only a continuous roll of recording paper to be used in the electrostatic recording apparatus, and no precut sheets of recording paper can be employed.

With the prior electrostatic recording apparatus, a portion of the continuous recording sheet which is coextensive with a distance W between the electrostatic recording head 3 and the cutter 6 becomes useless during a subsequent copying operation since no electrostatic image whatsoever can be formed on such sheet portion. The blank portion of the recording sheet must be severed by the cutter 6, which is required to be actuated to perform such paper cutting in a complex controlled operation.

It is accordingly an object of the present invention to provide an electrostatic recording appratus having an electrostatic recording head which is protected against unwanted damage due to frictional contact with an associated roller.

Another object of the present invention is to provide an electrostatic recording apparatus capable of recording or copying images substantially fully over the overall surface of a rolled sheet of recording paper without producing undesired useless blank portions thereon.

Still another object of the present invention is to provide an electrostatic recording apparatus which can record electrostatic images on sheets of recording paper having a variety of sizes.

A still further object of the present invention is to provide an electrostatic recording apparatus capable of electrostatically recording images on precut sheets of recording paper as well as on a rolled sheet of recording paper without the problem of waste portions of the recording paper.

SUMMARY OF THE INVENTION

To accomplish the foregoing objectives, there is provided an electrostatic recording apparatus which comprises an electrostatic recording head and a roller for forming an electrostatic image on the sheet of recording paper. The electrostatic recording head and the roller are relatively movable toward each other for pressing the sheet of recording paper against the electrostatic recording head during a period of time in which the sheet of recording paper travels between the electrostatic recording head and the roller to allow the electrostatic recording head to form the electrostatic image on the sheet of recording paper. The electrostatic recording head and the roller are relatively displaceable away from each other during a period of time other than the above period of time.

With this arrangement, electrodes on the electrostatic recording head are protected against frictional contact with and hence damage by the roller. No waste portions are produced from the sheet of recording paper as it is supplied from a roll of recording paper. The electrostatic recording apparatus can also employ precut sheets of recording paper for electrostatically recording images thereon.

The roller may be driven to rotate at all times to allow a simplified control for rotation of the roller. Alternatively, the roller may be driven to rotate only when the sheet of recording paper travels between the electrostatic recording head and the roller for better protection against damage to the electrodes on the electrostatic recording head.

According to the preferred embodiment of the invention, the roller comprises a first portion and at least one second portion. The first portion is able to be driven rotatably and be held against sheets of recording paper having various sizes, and the second portion is idly rotatable and is able to be selectively held at rest against the electrostatic recording head or rotatably against at least one of the sheets of recording paper.

When the sheet of recording paper is continuously supplied from a roll of recording paper, a cutter unit is disposed at the upstream side of the electrostatic recording head and the roller with respect to the direction of feed of the sheet of recording paper for cutting the sheet of recording paper. This prevents useless blank portions from being produced in the roll of recording paper. The sheet of recording paper may be of a precut length.

BRIEF DESCRIPTION OF THE DRAWINGS

This invention will now be illustrated in more detail by reference to the accompanying drawings; wherein.

DETAILED DESCRIPTION OF THE PREFERRED EMBODIMENT

The present invention will now be described with reference to FIGS. 1–12 of the drawings which illustrate preferred embodiments of the present invention.

Figure 2:
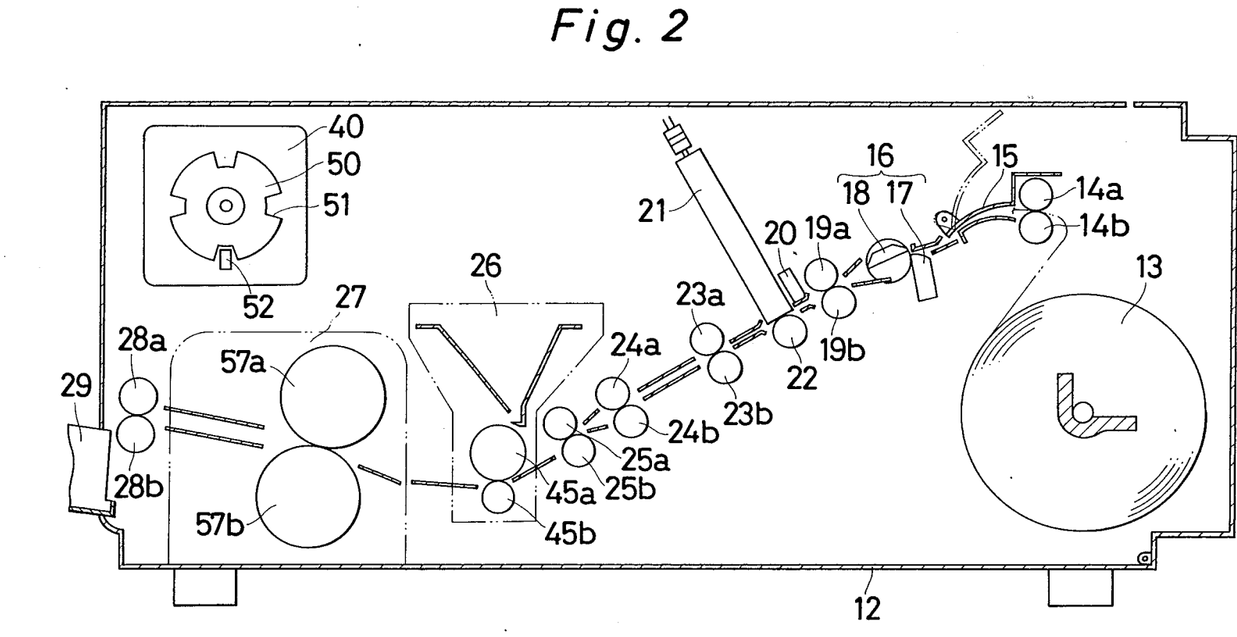
FIG. 2 is a longitudinal cross-sectional view of an electrostatic recording apparatus according to an embodiment of the present invention.

FIG. 2 is a longitudinal cross-sectional view of an embodiment of the present invention. An electrostatic recording apparatus has a machine frame 12 housing therein a roll 13 of recording paper from which a continuous sheet is unwound and fed along by a pair of rollers 14a, 14b through a guide plate assembly 15 to a cutter unit 16. The cutter unit 16 is composed of a fixed blade 17 and a rotatable blade 18 which is angularly displaceable for coacting with the fixed blade 17 to cut from the continuous sheet 13 a desired length cut sheet. The cut sheet of recording paper is then transported past the cutter unit 16 by a pair of rollers 19a, 19b and between an electrostatic recording head 21 and a roller 22 after a leading edge of the sheet has been detected by a detector 20. The sheet is then fed by pairs of rollers 23a, 23b; 24a, 24b; 25a, 25b into a development device 26. While the sheet passes between the electrostatic recording head 21 and the roller 22, an electrostatic image is formed on the sheet. The formed electrostatic image is subsequently developed into a toner image by the development device 26. The developed toner image is fixed to the sheet by a pressure fixation device 27. The sheet with the toner image fixed thereto is finally discharged by a pair of discharge rollers 28a, 28b out of the machine frame 12 into a tray 29.

Figure 3:
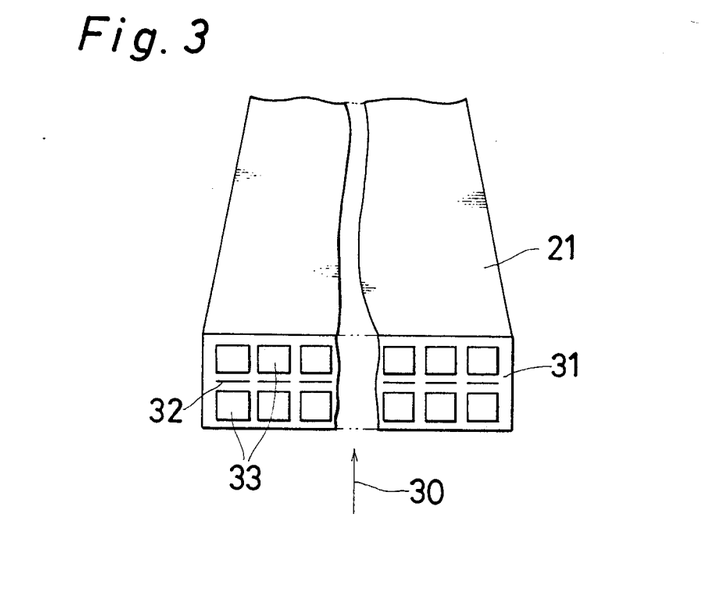
FIG. 3 is a fragmentary perspective view of an electrostatic recording head as seen from below when the head is positioned in its normal disposition.

As shown in FIG. 3, the electrostatic recording head 21 has on its lower surface facing the roller 22 an array of needle-shaped electrodes 32 and two arrays of auxiliary electrodes 33, the electrode arrays extending transversely across a direction (as shown by the arrow 30) of feed of the sheet of recording paper, or extending perpendicularly to the sheet of FIG. 2.

Figure 4:
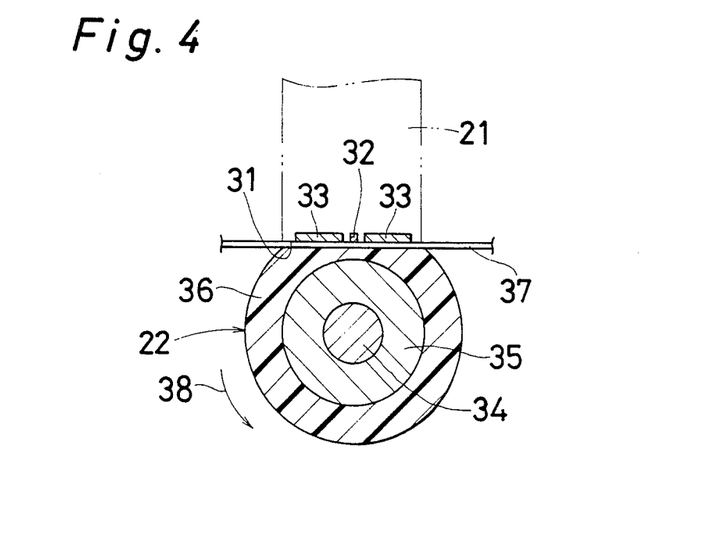
FIG. 4 is a transverse cross-sectional view of the electrostatic recording head and a roller.

The sheet of recording paper as it is fed along is sandwiched between the electrostatic recording head 21 and the roller 22 while an electrostatic image is being formed on the sheet, as illustrated in FIG. 4. The roller 22 includes a rotatable shaft 34, a cylindrical sleeve 35 fixedly fitted therearound, and a cylindrical cover layer 36 made of elastic material such as spongy resin and extending around the cylindrical sleeve 35. The sheet of recording paper, which is designated by the reference numeral 37 in FIG. 4, is pressed against the surface 31 of the electrostatic recording head 21 by the cover layer 36 while the electrostatic image is being formed on the sheet 37. The roller 22 is caused to rotate in the direction of the arrow 38 by the advancing movement of the sheet 37.

Figure 5:
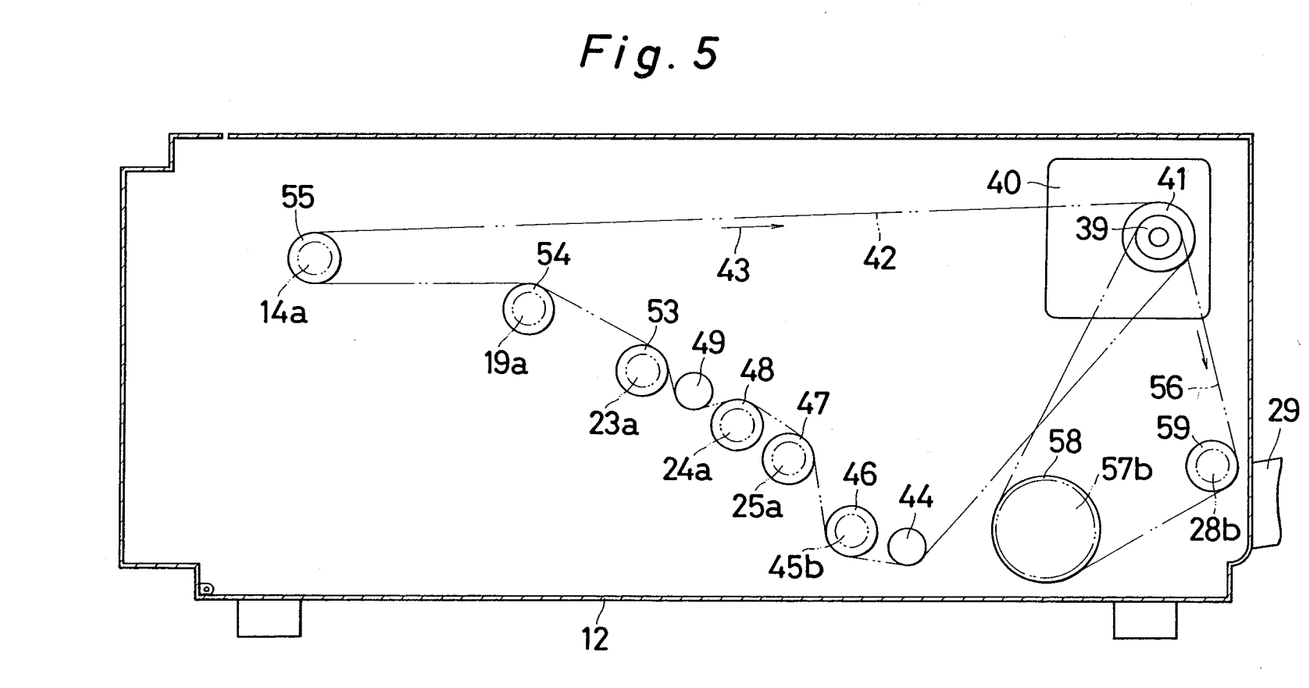
FIG. 5 is a longitudinal cross-sectional view of the electrostatic recording apparatus shown in FIG. 2 as seen from behind the same.

FIG. 5 is illustrative of a system for driving the electrostatic recording apparatus. The driving system comprises a motor 40 having an output shaft on which there is fixedly mounted a sprocket wheel 41 with an endless chain 42 travelling therearound. When the motor 40 is energized, the endless chain 42 is driven to travel in the direction of the arrow 43. The endless chain 42 also extends around an idler sprocket wheel 44, a sprocket wheel 46 fixed to one (45b) of a pair of rollers 45a, 45b in the development device 26 (FIG. 2), a sprocket wheel 47 fixed to the roller 25a, a sprocket wheel 48 fixed to the roller 24a, a tension sprocket wheel 49, a sprocket wheel 53 fixed to the roller 23a, a sprocket wheel 54 fixed to the roller 19a, and a sprocket wheel 55 fixed to the roller 14a. The output shaft of the motor 40 has another sprocket wheel 39 around which an endless chain 56 travels. The endless chain 56 extends around a sprocket wheel 58 fixed to one (57b) of a pair of fixation rollers 57a, 57b in the pressure fixation device 27 and a sprocket wheel 59 fixed to the discharge roller 28b. As shown in FIG. 2, the rate of rotation of the motor 40 for feeding the sheet of recording paper through an interval is detected by a photodetector 52 for detecting notches 51 formed at intervals in the edge of a light shield disc 50 drivable by the motor 40.

Figure 6:
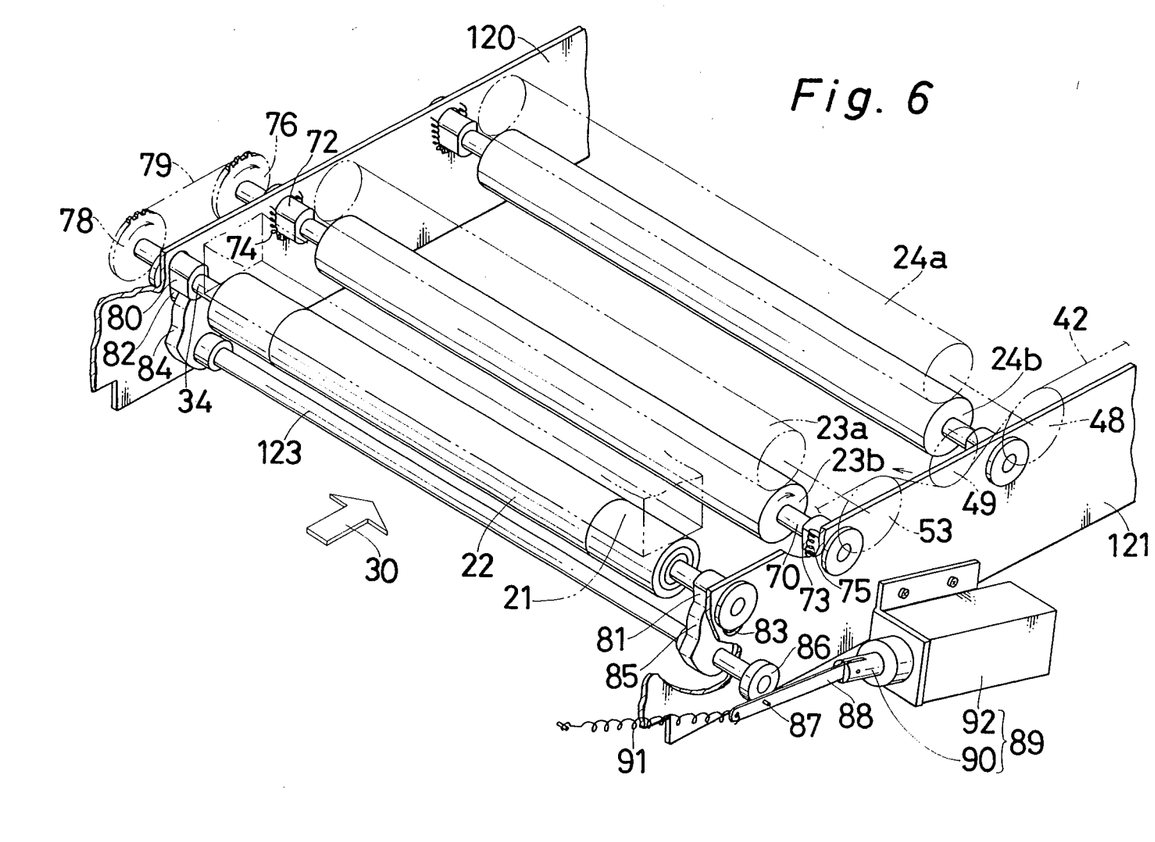
FIG. 6 is an enlarged fragmentary perspective view of the roller and other nearby components of the the electrostatic recording head.
Figure 7:
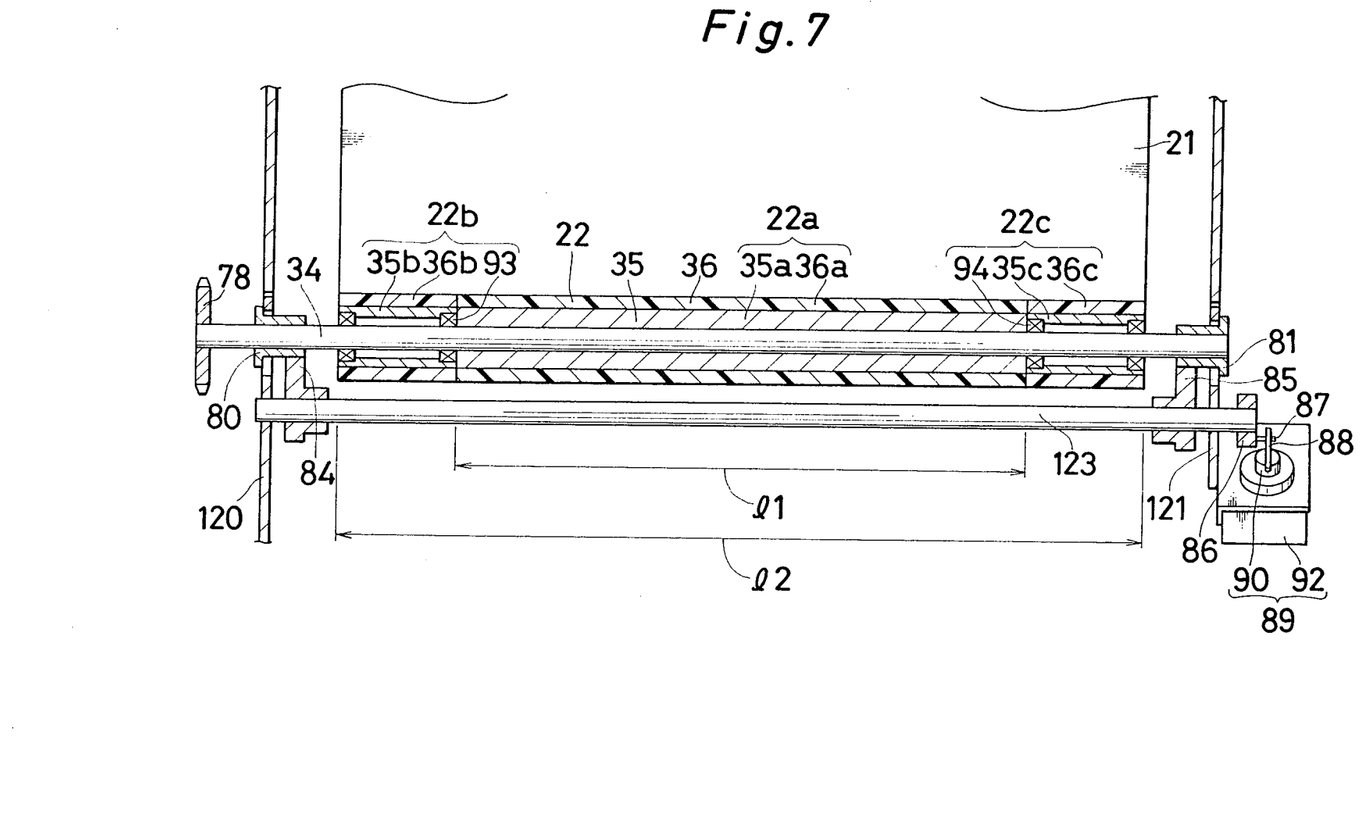
FIG. 7 is a longitudinal cross-sectional view of the roller illustrated in FIG. 6.
Figure 8:
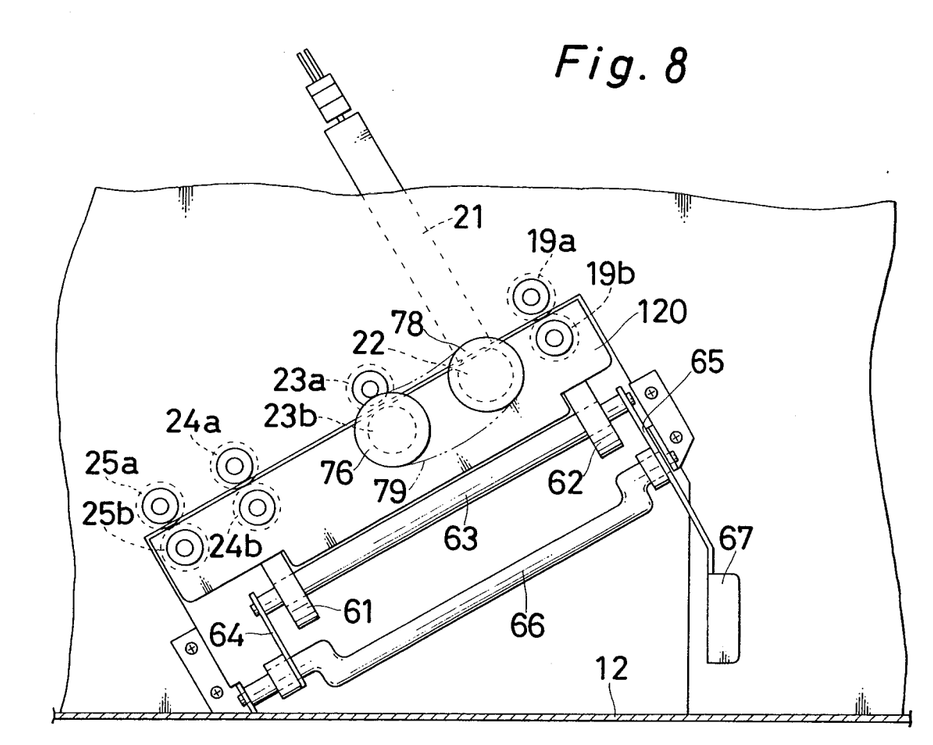
FIG. 8 is a front elevational view of the electrostatic recording head, the roller and other components.
Figure 9:
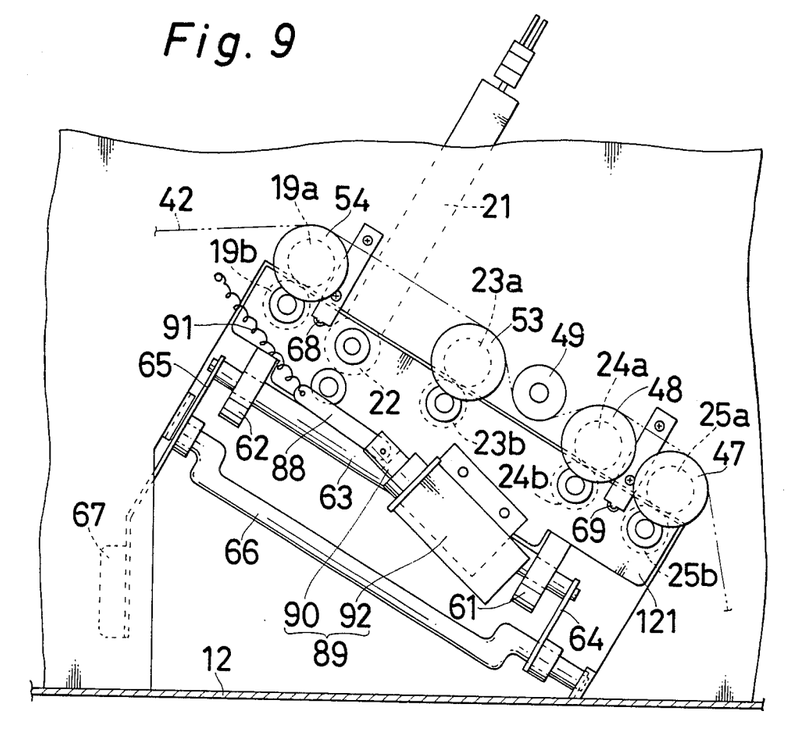
FIG. 9 is a rear elevational view of the electrostatic recording head, the roller and the other components.

In FIGS. 6 through 9, the rollers 22, 23b, 24b, 25b are rotatably supported by and between a pair of support plates 120, 121. The rollers 23a, 24a, 25a which are pressable against the rollers 23b, 24b, 25b, respectively, are rotatably supported by and between side plates of the machine frame 12. As illustrated in FIG. 8, the support plate 120 is engageable with a pair of rollers 61, 62 rotatably mounted on a shaft 63 supported on a pair of arms 64, 65 which are angularly movably mounted by a rod 66 on the machine frame 12. The arm 65 has a handle 67. The support plate 121 has an upper edge portion supported, by a pair of hooks 68, 69 fastened to one of the side plates of the machine frame 12, for angular displacement about an axis extending parallel to the direction in which the sheet of recording paper is fed along, that is, parallel to the sheet of FIG. 9. The parts are shown in FIGS. 8 and 9 as being ready for recording an image on the sheet of recording paper and transporting the latter. When the sheet of recording paper is jammed, the handle 67 is turned about the rod 66 to angularly displace the arms 64, 65 to move the rollers 61, 62 out of contact with the support plate 120, which is then angularly displaced about the hooks 68, 69 into a downward position as shown in FIG. 8. The jammed sheet can thereafter be taken out of the machine frame 12. The illustrated arrangement thus allows easy maintenance.

The roller 23b is supported on a rotatable shaft 70 journalled at end portions thereof in a pair of bearings 72, 73 loosely fitted respectively in the support plates 120, 121 for slight vertical displacement with respect to the support plates 120, 121. The bearings 72, 73 are normally urged by springs 74, 75, respectively, upwardly relatively to the support plates 120, 121 so that the roller 23b can be resiliently held against the roller 23a. The rollers 19b, 24b, 25b are similarly arranged so that they can be resiliently held against the rollers 19a, 24a, 25a, respectively. A sprocket wheel 76 is affixed to one end of the shaft 70 (FIGS. 6 and 8), and a sprocket wheel 78 is affixed to one end of the shaft 34 of the roller 22. An endless chain 79 is trained around the sprocket wheel 76 and the sprocket wheel 78. The shaft 34 is journalled at end portions thereof in a pair of bearings 80, 81 loosely disposed respectively in a pair of slots 82, 83 defined in the support plates 120, 121, respectively, and having longitudinal axes parallel to the electrostatic recording head 21. The bearings 80, 81 have flat surfaces extending parallel to the slots 82, 83 and engaging side edges thereof, thus preventing relative angular displacement between the bearings 80, 81 and the support plates 120, 121.

A shaft 123 is rotatably mounted by and extends between the support plates 120, 121 for angular movement about its own axis extending parallel to the shaft 34. The shaft 123 is located remotely from the electrostatic recording head 21 with the shaft 34 interposed therebetween. A pair of cams 84, 85 are secured to the shaft 123 at its end portions, respectively, for contact with lower surfaces of the bearings 80, 81, respectively. An attachment wheel 86 is mounted on one end of the shaft 123 outside of the support plate 121 and has an eccentric pin 87 projecting parallel to the axis of the shaft 123. To the eccentric pin 87, there is pivotably attached an actuator bar 88 coupled to a plunger 90 of a solenoid-operated plunger unit 89. The actuator bar 88 is connected at a distal end thereof to a tension spring 91 for normally biasing the actuator bar 88 in a direction away from the solenoid-operated plunger unit 89. When a solenoid 92 of the solenoid-operated plunger unit 89 is energized, the plunger 90 and hence the actuator bar 88 are axially displaced against the biasing force of the tension spring 91 to the right as illustrated in FIGS. 6 and 9. Then, the cams 84, 85 are angularly moved into engagement with the bearings 80, 81, respectively, to displace the latter toward the electrostatic recording head 21. When the solenoid 92 is de-energized, the plunger 90 and the actuator bar 88 are forced by the tension spring 91 to return to the left (FIGS. 6 and 9), thereby turning the cams 84, 85 out of engagement with the bearings 80, 81, which are then allowed to descend by gravity along the slots 82, 83, respectively. The shaft 34 and hence the roller 22 are now lowered away from the electrostatic recording head 21. The roller 22 and the electrostatic recording head 21 are thus spaced from each other with a clearance defined therebetween.

In operation for electrostatic image recording, the motor 40 is energized to rotate the rollers 14a, 19a for transporting the leading edge of the continuous sheet 13 of rolled recording paper through the cutter unit 16 toward the electrostatic recording head 21. Before the leading edge of the continuous sheet 13 is detected by the detector 20, the solenoid 92 of the solenoid-operated plunger unit 89 remains de-energized. When the detector 20 detects the leading edge of the continuous sheet 13 as it reaches a position immediately below or near the electrostatic recording head 21, the solenoid 92 is energized to displace the roller 22 toward the electrostatic recording head 21. The continuous sheet is now fed along as it is held against the surface 31 of the electrostatic recording head 21, during which time a sharp electrostatic image is formed on the continuous sheet. The length of an individual sheet to be cut off is preset by a processing unit including a microcomputer. When the photodetector 52 detects that the motor 40 has transported a length of the continuous sheet to be severed, the cutter unit 16 responds to the detection by the photodetector 52 to cut off the continuous sheet 13 into an individual sheet. When the trailing edge of the cut sheet as it is passed between the electrostatic recording head 21 and the roller 22 is detected by the detector 20, the solenoid 92 is de-energized to lower the roller 22 away from the electrostatic recording head 21. Therefore, the needle-shaped electrodes 32 and the auxiliary electrodes 33 on the electrostatic recording head 21 are protected against direct frictional contact with and resulting damage by the roller 22 after the sheet has left the electrostatic recording head 21. As illustrated in FIG. 7, the roller 22 is composed of a central portion 22a and a pair of end portions 22b, 22c disposed axially one on each side of the central portion 22a. The central portion 22a comprises a cylindrical sleeve 35a securely fitted over the shaft 34 and a cylindrical cover layer 36a made of a flexible material such as spongy rubber and fitted over the sleeve 35a. The end portion 22b has a cylindrical sleeve 35b, a cylindrical cover layer 36b fitted over the sleeve 35b, and a pair of bearings 93 supporting the sleeve 35b rotatably around the shaft 34. Likewise, the end portion 22c comprises a cylindrical sleeve 35c, a cylindrical cover layer 36c fitted over the sleeve 35c, and a pair of bearings 94 supporting the sleeve 35c rotatably around the shaft 34. The sleeves 35a, 35b, 35c jointly constitute the sleeve 35, and the layers 36a, 36b, 36c jointly constitute the layer 36, as shown in FIG. 4.

The sheet of recording paper is fed along between the electrostatic recording head 21 and the roller 22 with the transverse center of the sheet being aligned with the axial center of the roller 22. The central roller portion 22a has an axial length l1 selected to cover the widths of the Japanese Industrial Standards sizes A4 and A5 so that sheets of such sizes will be transported fully in contact with the central portion 22a over the length l1. During an electrostatic image recording operation, the end portions 22b, 22c are held against the surface 31 of the electrostatic recording head 21, but are prevented from rotating by the bearings 93, 94 to thereby protect the needle-shaped electrodes 32 and the auxiliary electrodes 33 against damage due to frictional contact with the end portions 22b, 22c. The combined length l2 of the roller portions 22a, 22b, 22c is selected to cover the widths of the Japanese Industrial Standards sizes B4 and B5. Sheets having such sizes can be fed along in contact with the roller portions 22a, 22b, 22c fully over the length l2. When B4 and B5 size sheets are transported, they are held in contact with the end portions 22b, 22c, which are caused to rotate. The sheet of recording paper can therefore be held reliably against the surface 31 of the electrostatic recording head 21. Where the sheet is of A4 or A5 size, the end portions 22b, 22c remain at rest and the needle-shaped electrodes 32 and auxiliary electrodes 33 of the electrostatic recording head 22 will be free from any damage which would otherwise result from frictional contact with the end portions 22b, 22c of the roller 22.

Figure 10:
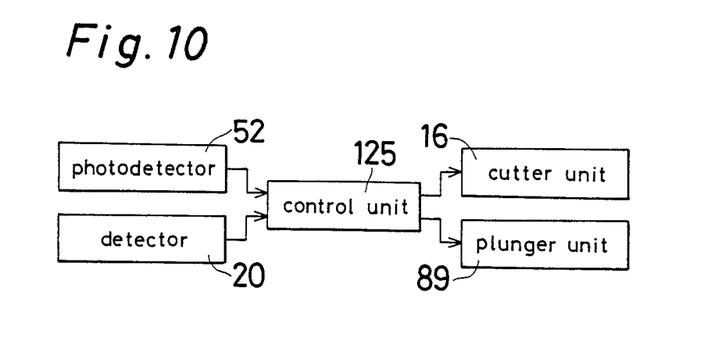
FIG. 10 is a block diagram of a circuit for controlling a cutter and a solenoid-operated plunger unit.

FIG. 10 shows a circuit arrangement for controlling the solenoid-operated plunger unit 89 and the cutter unit 16. A control unit 125 is responsive to outputs from the photodetector 52 and the detector 20 for controlling the cutter unit 16 and the solenoid-operated plunger unit 89 in the manner described above.

Figure 11:
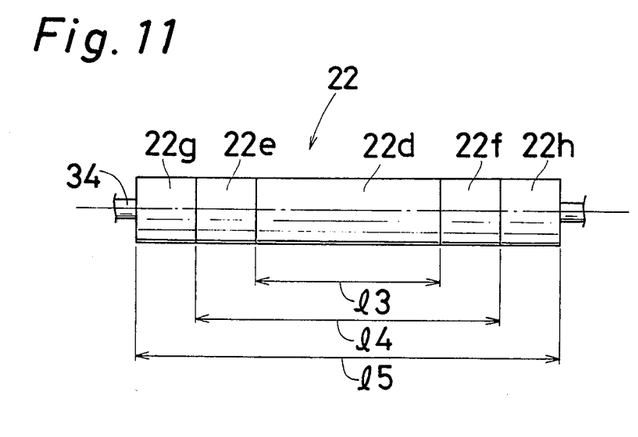
FIG. 11 is a plan view of a roller according to another embodiment of the present invention.

FIG. 11 illustrates a roller 22 according to another embodiment of the invention. The roller 22 is composed of portions 22d through 22h arranged in the axial direction thereof, the central portion 22d being fixed to a rotatable shaft 34. The roller portions 22e through 22h are of the same construction as that of the roller portions 22b, 22c (FIG. 7) such that the roller portions 22e through 22h will be rotatable with respect to the shaft 34. The central portion 22d has a length l3; the central portion 22d and the portions 22e, 22f have a total length l4; and the portions 22d through 22h have a total length l5. When sheets having widths corresponding to the lengths l3, l4, l5, respectively, are transported during electrostatic image recording, the shaft 34 and hence the central portion 22d are driven to rotate at all times. More specifically, when a sheet having the minimum width in conformity with the length l3 is transported, the roller portions 22e through 22h remain stationary in pressed engagement with the surface 31 of the electrostatic recording head 21. When a sheet wide enough to cover the length l4 is fed, the roller portions 22e, 22f are rotated by the travelling sheet while the roller portions 22g, 22h remain at rest and are held against the surface 31 of the electrostatic recording head 21. When a sheet having a width corresponding to the length l5 is transported, the roller portions 22e through 22h are caused to rotate by the sheet as it is fed along. The rotating roller portions 22d through 22h are held in contact with the sheet of recording paper, but out of direct contact with the surface 31 of the electrostatic recording head 21. The roller portions 22e through 22h are selectively held stationary in abutment against the surface 31 of the electrostatic recording head 21 when sheets have widths corresponding to the lengths l3 and l4 are fed. Accordingly, the needle-shaped electrodes 32 and auxiliary electrodes 33 of the electrostatic recording head 21 are prevented from being damaged by the roller 22.

Figure 12:
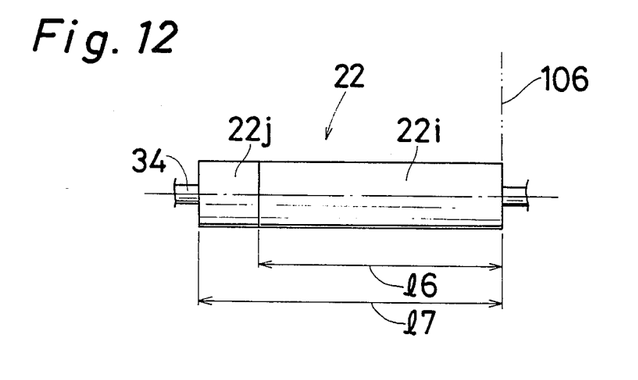
FIG. 12 is a plan view of a roller according to still another embodiment of the present invention.

FIG. 12 is illustrative of another roller 22 constructed in accordance with still another embodiment of the invention. The roller 22 is composed of a first portion 22i secured to rotatable shaft 34 and a second portion 22j rotatable with respect to the shaft 34 and supported in the same manner as that in which the roller portions 22b, 22c, 22e through 22h (FIGS. 7 and 11) are supported. Sheets of recording paper having various sizes are transported with one edge aligned with an imaginary reference line 106 at one end of the first portion 22i remote from the second portion 22j. When a sheet being fed has a width equal to the length l6 of the first portion 22i, the second portion 22j is held at rest against the surface 31 of the electrostatic recording head 21. When a sheet having a width corresponding to the combined length l7 of the first and second portions 22i, 22j is transported, the second portion 22j is caused to rotate by travelling movement of the sheet. Accordingly, the roller 22 illustrated in FIG. 12 is effective to protect the needle-shaped electrodes 32 and auxiliary electrodes 33 of the electrostatic recording head 21 against any damage due to frictional contact with the roller 22.

As another arrangement, the roller 22 may be driven by an electromagnetic clutch (not shown) which is connected when or just before the leading edge of the sheet of recording paper is sandwiched between the electrostatic recording head 21 and the roller 22. The electromagnetic clutch may be arranged to be de-energized to stop the roller 22 in response to movement of the trailing edge of the sheet past the electrostatic recording head 21 and the roller 22.

In the illustrated embodiments, the roller 22 can continuously be rotated about its own axis at all times regardless of whether it presses the sheet of recording paper against the surface 31 of the electrostatic recording head 21 or is displaced away from the electrostatic recording head 21. Such an arrangement allows a simpler control for rotation of the roller 22.

The electrostatic recording apparatus can use precut sheets of recording paper as well as the roll 13 of recording paper. Where precut sheets of recording paper are employed, the cutter unit 16 may be dispensed with.

In the above embodiments, the roller 22 has been shown as being displaceable with respect to the electrostatic recording head 21. However, the electrostatic recording head 21 may be arranged to move toward and away from the roller 22. Alternatively, the electrostatic recording head 21 and the roller 22 may be constructed such that they will move toward and away from each other. Such relative movement of the electrostatic recording head 21 and the roller 22 should be effected in timed relation to the transportation of the sheet of recording paper in the same manner as that in which only the roller 22 is displaceable as described above.

Although certain preferred embodiments have been shown and described, it should be understood that many changes and modifications may be made thereto without departing from the scope of the appended claims.

What is claimed is:

1. An electrostatic recording apparatus for recording an image on sheets of recording paper of various widths, said apparatus comprising:
    an electrostatic recording head for forming an electrostatic image on a sheet of recording paper;
    a roller for pressing the sheet of recording paper against said recording head;
    means mounting said recording head and said roller for relative displacement toward and away from each other between an operative position, whereat said roller presses the sheet of recording paper against said recording head during a first period of time in which the sheet of recording paper travels between said recording head and said roller to enable said recording head to form the electrostatic image on the sheet of recording paper, and an inoperative position, whereat said roller is spaced from said recording head during periods of time other than said first period of time;
    said roller comprising a first length portion and at least one second length portion mounted for free idling rotation relative to said first length portion; and
    means for rotating said first length portion such that, with said roller and said recording head being in said operative position, when the sheet of recording paper has a width equal to the length of said first length portion, said second length portion is held stationary against said recording head, and when the sheet of recording paper has a width greater than said length of said first length portion, said second length portion is pressed against the sheet of recording paper and caused to rotate thereby.

2. An apparatus as claimed in claim 1, wherein said first length portion has at opposite axial ends thereof respective said second length portions, and the sheet of recording paper is aligned with the center line thereof passing along the axial center position of said roller.

3. An apparatus as claimed in claim 1, wherein said second length portion is positioned at a first axial end of said first length portion, a second axial end of said first length portion comprises a respective end of said roller, and the sheet of recording paper is aligned with one edge thereof passing along said roller end.

4. An apparatus as claimed in claim 1, wherein said rotating means rotates said first length portion at all times during operation of the apparatus.

5. An apparatus as claimed in claim 1, wherein said rotating means rotates said first length portion at least during said first period of time.

6. An apparatus as claimed in claim 1, wherein the sheet of recording paper is supplied from a continuous roll, and further comprising cutter means positioned upstream of said recording head and said roller, with respect to the direction of feed of the sheet of recording paper, for cutting the sheet of recording paper from the roll.

7. An apparatus as claimed in claim 1, wherein the sheet of recording paper is supplied from a supply of sheets of precut length.

* * * * *